US007958239B1

(12) United States Patent
Chebrolu (10) Patent No.: US 7,958,239 B1
(45) Date of Patent: *Jun. 7, 2011

(54) MULTILINK POINT-TO-POINT PROTOCOL NETWORK ACCESS SERVER CHANNEL ALLOCATION METHOD AND APPARATUS

(75) Inventor: Prasad Y. Chebrolu, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 1498 days.

This patent is subject to a terminal disclaimer.

(21) Appl. No.: 10/860,533

(22) Filed: Jun. 2, 2004

Related U.S. Application Data

(63) Continuation of application No. 09/412,840, filed on Oct. 5, 1999, now Pat. No. 6,754,714.

(51) Int. Cl.
*G06F 15/173* (2006.01)
*G06F 15/16* (2006.01)
(52) U.S. Cl. ......... 709/226; 709/223; 709/225; 709/228
(58) Field of Classification Search .................. 709/228, 709/226, 225, 223
See application file for complete search history.

(56) References Cited

U.S. PATENT DOCUMENTS

| | | |
|---|---|---|
| 4,701,910 A | 10/1987 | Ulug |
| 5,249,290 A | 9/1993 | Heizer |
| 5,287,461 A | 2/1994 | Moore |
| 5,761,507 A | 6/1998 | Govett |
| 5,862,348 A | 1/1999 | Pedersen |
| 5,880,867 A | 3/1999 | Ronald |
| 5,966,372 A | 10/1999 | Wright et al. |

(Continued)

FOREIGN PATENT DOCUMENTS

WO    WO 0044133    7/2000

OTHER PUBLICATIONS

Caves et al., "Two B's in One", May 25, 1998, Telephony, Interec Publishing, vol. 234, Issue 21, pp. 28-32.

(Continued)

*Primary Examiner* — Peling A Shaw
*Assistant Examiner* — Umar Cheema
(74) *Attorney, Agent, or Firm* — Stolowitz Ford Cowger LLP (57) ABSTRACT

In a multilink point-to-point protocol (PPP) network access server, a method is provided in one aspect of the invention allocating ports among various users that includes allocating primary ports among various users, and thereafter, allocating secondary ports among various users only until the number of allocated secondary ports reaches a prescribed maximum.

Another aspect of the invention may be thought of as a back-channel allocation method that includes determining whether a back channel is actually being used by a first network client, and if not then allocating the unused back channel to a second network client. In a final aspect of the invention an auxiliary channel resource allocation apparatus for use with a multilink PPP access server, is provided that includes decision or detection logic determining the availability of an auxiliary channel resource previously allocated to a first user of the access server, the decision logic signaling such availability, and allocation or reallocation logic responsive to the signaling to allocate the available auxiliary channel resource to a second user of the access server. The foregoing and other objects, features and advantages of the invention will become more readily apparent from the following detailed description of a preferred embodiment which proceeds with reference to the drawings.

16 Claims, 3 Drawing Sheets

U.S. PATENT DOCUMENTS

| | | | |
|---|---|---|---|
| 6,016,313 | A | 1/2000 | Foster et al. |
| 6,088,728 | A | 7/2000 | Bellemore et al. |
| 6,094,659 | A | 7/2000 | Bhatia |
| 6,105,067 | A | 8/2000 | Batra |
| 6,175,575 | B1 | 1/2001 | Ahuja et al. |
| 6,208,640 | B1 | 3/2001 | Spell et al. |
| 6,222,837 | B1 | 4/2001 | Ahuja et al. |
| 6,243,751 | B1 | 6/2001 | Chatterjee et al. |
| 6,259,705 | B1 | 7/2001 | Takahashi et al. |
| 6,282,424 | B1 | 8/2001 | Wright et al. |
| 6,285,670 | B1 * | 9/2001 | Ghai et al. .................... 370/352 |
| 6,336,147 | B1 | 1/2002 | Brownell et al. |
| 6,359,863 | B1 | 3/2002 | Varma et al. |
| 6,378,130 | B1 | 4/2002 | Adams |
| 2001/0018701 | A1 | 8/2001 | LiVecchi |

OTHER PUBLICATIONS

Richards et al., RFC 2125, The PPP Bandwidth Allocation Protocol (BAP), The PPP Bandwidth Allocation Control Protocol (BACP), Mar. 1997, Network Working Group, pp. 2-24.

Stolowitz Ford Cowger LLP, "Listing of Related Cases", U.S. Appl. No. 10/860,533, filed Jun. 2, 2004, of Prasad Y. Chebrolu, entitled Multilink Point-to-Point Protocol Network Access Server Channel Allocation Method and Apparatus, Nov. 11, 2010, 1 page.

* cited by examiner

MULTILINK POINT-TO-POINT PROTOCOL NETWORK ACCESS SERVER CHANNEL ALLOCATION METHOD AND APPARATUS

This application is a continuation of prior U.S. patent application Ser. No. 09/412,840, filed Oct. 5, 1999 now U.S. Pat. No. 6,754,714.

BACKGROUND OF THE INVENTION

This invention relates to multilink point-to-point protocol (PPP) network access servers (NASs) that allocate ports or channels to users on demand. More particularly, the invention concerns allocation of limited channels among various users including earlier users who already may have been allocated primary channels and so-called back-channels, e.g. so-called $2^{nd}$ B channels, and later users who may simply desire access to an Internet service provider (ISP) via a port or channel invoked by a dial-up access request.

Ports on a multilink PPP NAS provide a direct connection between a user and an ISP. Thus, an allocated channel may be thought of as being dedicated to a particular user for the duration of that user's use of the channel. Typically, a NAS allocates a primary channel to each user who requests access. It is common practice for a NAS also to allocate a secondary channel, or what may be referred to herein as an auxiliary or back channel, to any user who requests another channel for purposes of increasing download bandwidth. If all available channels on a given NAS are allocated among various users, then no new users can obtain access because there is no available channel. Thus, during busy times, many would-be users will be denied access to their desired ISP by the NAS.

A user who requests a secondary channel may use the channel, and may benefit from the increased download bandwidth, only for a short period of time compared to the amount of connect time, i.e. the duration of the session. Accordingly, once-allocated secondary channels might represent an unused resource. Nevertheless, the channel once allocated is unavailable to other users, users who are denied access by the NAS to their desired ISP.

Heretofore, there has been no deliberate allocation among earlier users of secondary channels and later would-be users of primary channels that intelligently manages contention between earlier and later users of the limited channel resources.

SUMMARY OF THE INVENTION

In a multilink point-to-point network access server, a method is provided in one aspect of the invention allocating ports among various users that includes allocating primary ports among various users, and thereafter, allocating secondary ports among various users only until the number of allocated secondary ports reaches a prescribed maximum.

Another aspect of the invention may be thought of as a back-channel allocation method that includes determining whether a back channel is actually being used by a first network client, and if not then allocating the unused back channel to a second network client. In a final aspect of the invention an auxiliary channel resource allocation apparatus for use with a multilink point-to-point access server, is provided that includes decision logic determining the availability of an auxiliary channel resource previously allocated to a first user of the access server, the decision logic signaling such availability, and allocation logic responsive to the signaling to reallocate the available auxiliary channel resource to a second user of the access server. The foregoing and other objects, features and advantages of the invention will become more readily apparent from the following detailed description of a preferred embodiment which proceeds with reference to the drawings.

DETAILED DESCRIPTION OF THE PREFERRED EMBODIMENT

Figure 1:
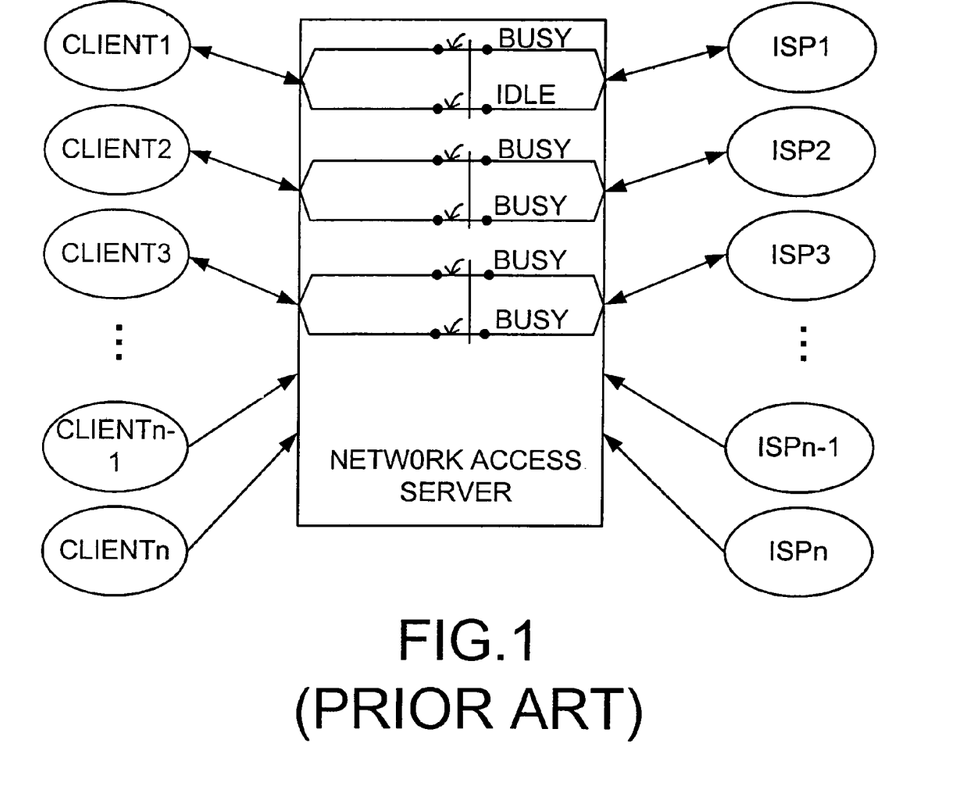
FIG. 1 is a system block diagram of a prior art multilink point-to-point protocol (PPP) network access server (NAS) connecting various users/clients with various Internet service providers (ISPs).

FIG. 1 represents a prior art system block diagram showing a multilink PPP NAS linking $CLIENT_1$ through $CLIENT_n$ with $ISP_1$ through $ISP_n$ via a fixed number of paired channels indicated as pairs of solid lines extending through the NAS block. For the sake of simplicity in FIG. 1 (and in similarly arranged FIG. 2), a given client is shown connected with a given ISP, but it will be understood that a single client typically may be connected with any one or more of plural ISPs, and that any one or more of plural clients may be connected with a single ISP.

Those of skill in the art will appreciate that, in accordance with prior art systems, the NAS typically allocates a primary channel (the top line in each pair, having a closed switch) linking a user/client with an ISP in response to a user/client request, e.g. an end user dialing up the ISP via a high-speed modem (not shown). Customarily, the NAS in prior art systems also allocates a secondary channel (the bottom line in each pair, also having a closed switch) backing up the primary channel for each user/client. The NAS of the prior art system continues to allocate primary and secondary channels to each user/client until all channels are allocated. Thereafter, it will be appreciated by those skilled in the art, further user/client requests for an ISP connection are denied.

NASs in prior art systems have a fixed number of channels that are allocable to various users/clients. Conventionally, the NAS does not de-allocate a channel—whether primary or secondary—until such time as the connected user/client exits the application that invoked the connection. For example, the user/client may exit the network application. Or the client may explicitly request disconnection from the ISP. Or the user may log off his or her computer. Only upon the occurrence of such a directive from the user/client does the NAS de-allocate, or release, the once-allocated primary and secondary channels.

Those of skill in the art will appreciate that prior art primary and secondary channel connections are established virtually as a pair of ganged switches both of which are closed (both channels are allocated) or both of which are open (neither channel is allocated). Such ganged switch pairs are used to illustrate the primary and auxiliary channels in FIG. 1 and it may be seen that, so long as the top switch representing the primary channel is closed the lower switch also is closed. Because all channels at times may be allocated, whether "used" or "idle" (as in the case of $CLIENT_1$), a request from later users/clients such as $CLIENT_{n-1}$ and $CLIENT_n$ to connect with an ISP would be denied, as indicated in FIG. 1 by the lack of connection within the NAS between these clients and an ISP.

Customer service is adversely affected when a user/client's request for an ISP connection is denied due to lack of allocable channel capacity. Often, a once-allocated channel is idle and not in use by an earlier user/client. Nevertheless, the unused channel remains allocated to the earlier but idle user/client and thus is unavailable for use by a later user/client who needs it. In terms of the NAS's 'customers', a) users/clients are frustrated by lack of access to the ISP, and b) ISPs lose revenue by such a waste of an unused but heretofore unallocable channel resource, as the ISPs are unable to service more users/clients.

Figure 2:
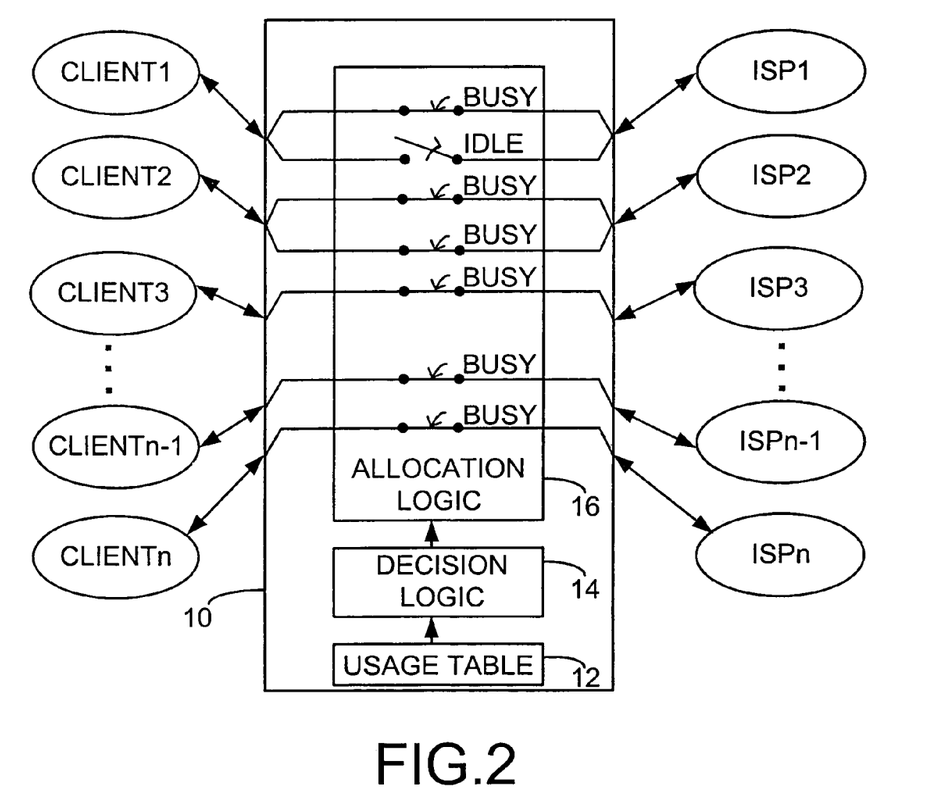
FIG. 2 is a system block diagram of the NAS channel allocation apparatus according to the invention.

FIG. 2 illustrates the multilink PPP NAS channel allocation apparatus 10 in the form of a system block diagram corresponding generally to that of FIG. 1. It may be seen from FIG. 2 that a later client $CLIENT_n$ has gained access to an ISP by virtue of the fact that the idle auxiliary channel previously allocated to an earlier client $CLIENT_1$ has been allocated to later client $CLIENT_n$. Apparatus 10 preferably includes a usage table 12, decision logic 14 and allocation logic 16 that cooperate to configure the primary and auxiliary channels for optimum use by the largest possible number of users/clients.

Usage table 12 in accordance with the invention maintains the current status of both primary and secondary channel resources, preferably on a client-by-client basis. For example, usage table 12 indicates to decision logic 14, which in turn indicates to allocation logic 16, whether a client service request is from a client who already has a primary channel allocated or instead is from a new client. In the former case, a secondary channel is allocated to the client if such is available. In the latter case, a primary channel is allocated to the new client if a primary channel is available and if not then a secondary channel is allocated to the new client if a secondary channel is available. If a secondary channel is not available because it is already allocated, but it can be made to be available because it is not in use or it is being under-utilized, then it is freed up, or de-allocated, and reallocated to the new user. This technique in accordance with the invention will be described in detail below by reference to FIG. 3.

It will be appreciated that the channels described and illustrated herein are conventional; it is the ways and means by which they are allocated that is novel. Thus, in the schematic diagrams of FIGS. 1 and 2, primary and secondary channels are illustrated as simple solid lines with switches the closing and opening of which illustrates the connecting and disconnecting of a user/client with an ISP via the channel and channel structure details are not shown. Those of skill will appreciate that channels, as used herein, refers to logical and/or physical means by which a client and one or more ISPs are linked with one another for unidirectional or bi-directional communication in accordance with conventional multilink PPP technology. Thus, typical channels or ports (used interchangeably herein) may have physical attributes including physical ports, serial communication lines and data buffers as well as logical attributes such as status tables, queues and software drivers that provide control handshake, data routing, buffer management and other needed or desired standard and/or custom communication and operating system protocols.

According to the invention, primary and auxiliary channels are substantially decoupled from one another, i.e. they operate substantially independently from one another. Although they usually are allocated together (to a single user/client), they often are de-allocated separately from one another. In this way, decision logic 14 determines auxiliary channel resource availability substantially without regard to the availability of a primary channel resource that may be associated with the auxiliary channel resource and signals the fact, e.g. by setting a flag in memory. Allocation logic 12 in response to such a signal then may reallocate the available auxiliary channel resource to a second user of the access server. This is in contrast to prior art techniques that simply assumed no auxiliary channel resource associated with a primary channel resource would be available, unless and until the primary channel resource was available for use.

Illustrative of this unique approach to auxiliary channel resource allocation, primary and auxiliary channels are interconnected in FIG. 2 as pairs of unganged switches, i.e. switches that are operated independently from one another. This enables allocation logic 16 (in response to a determination by decision logic 14 from use table 12 that earlier client $CLIENT_1$'s auxiliary channel is idle) to reallocate the idle auxiliary channel which was previously allocated to earlier client $CLIENT_1$ to later client $CLIENT_n$, thereby permitting later client $CLIENT_n$ access to an ISP. (This reallocation is shown in FIG. 2 as linking later client $CLIENT_n$ to $ISP_n$. Those skilled in the art will appreciate that apparatus 10 may connect any client to any ISP.) Importantly, such is accomplished according to the invention without impeding earlier client $CLIENT_1$, who can continue to make full use of the previously allocated primary channel.

Those of skill in the art will appreciate that allocation, de-allocation (which refers simply to rendering free a once-allocated channel for reallocation to a user/client other than the one to which it was earlier allocated) and reallocation of channel resources may be done using queues or stacks or other suitable means in accordance with known shared-resource management techniques. For example, channel resource allocation may use lists of available and in-use channels, whereby prior requests are queued in the order they are received such that unfulfilled user/client requests for service are selectively handled. In accordance with the invention, the selection criteria include priority in time of the various user/client requests and the availability of unused or under-utilized channel resources. Other suitable selection criteria may be used, within the spirit and scope of the invention.

An unused channel resource, or port, is readily understood by those of skill in the art as representing a channel resource that is either unallocated or presently unused by the client to which the channel is allocated. An under-utilized channel resource, or port, will be understood to represent a channel resource that is a candidate for de-allocation from the client to which it is allocated so as to free up the channel resource for more productive use. If a primary and a secondary channel are allocated to a client, but the client is using only a fraction of the total bandwidth of the primary and secondary channels, then it may be desirable to increase the use of the primary channel and de-allocate the secondary channel with respect to such an under-utilizing client. The client previously under-utilizing the primary and secondary channel pair will then more fully utilize the still-allocated primary channel, without limitation or discernible impact, while the freed up secondary channel may be reallocated to a new user. Such determination of under-utilization in accordance with the invention is based upon prescribed criteria that form a part of decision logic 14 and usage data from usage table 12.

Cases in which a client (to which are allocated both a primary and a secondary channel) is using less than 50% of the total two-channel bandwidth straightforwardly are handled. Allocation logic 16 can simply move the client's secondary channel traffic to the client's primary channel and de-allocate the secondary channel without any discernible adverse impact on the client. Cases in which a client (to which are allocated both a primary and a secondary channel) is using modestly more than 50% of the total two-channel bandwidth also are contemplated by the invention. In such cases, decision logic 14 may impose a modest limitation of use on the earlier client in favor of a new client. In other words, a secondary channel allocated to an earlier client may be reallocated to a new client even if there is a modest adverse impact on the earlier client.

For example, an earlier client may be utilizing an allocated primary channel at 60% and an allocated secondary channel at 50%. Traffic represented by the earlier client's use of the secondary channel may be moved by the access server's decision logic 14 and allocation logic 16 to the earlier client's primary channel at a modest 10% adverse impact on bandwidth. Importantly, a later client which may have been otherwise denied access altogether may be allocated the earlier user's de-allocated secondary channel and may use the reallocated channel's full bandwidth. Those of skill in the art will appreciate that the under-utilization criteria are variable and may be prescribed depending upon overall system responsiveness and utilization goals and customer service goals. Thus, the example and the criteria on which it is based are not intended to limit in any way the scope of the invention.

Another important feature of the invention illustrated in FIG. 1 is the fact that, while $CLIENT_1$ and $CLIENT_2$ have been allocated primary and secondary channels, $CLIENT_3$ has been allocated only a primary channel. This makes it possible to allocate another of the limited channels to $CLIENT_{n-1}$ as indicated by its connection to $ISP_{n-1}$. The invention in this aspect allocates secondary channels along with primary channels only until a prescribed threshold number of allocated secondary channels (or only until a prescribed threshold ratio of allocated secondary channels to allocated primary channels) is reached, after which no further secondary channels are automatically allocated in response to a new user/client request. Allocation logic 16 in response to data read by decision logic 14 from usage table 12 preferably makes the intelligent decision in such case to reserve limited channel capacity for later users/clients (as will be described in more detail by reference to the flow chart of FIG. 3). This limited secondary channel allocation feature minimizes the possibility of having to deny a network access service request from a later client, while continuing to provide at least primary channel capacity to an earlier client.

Figure 3:
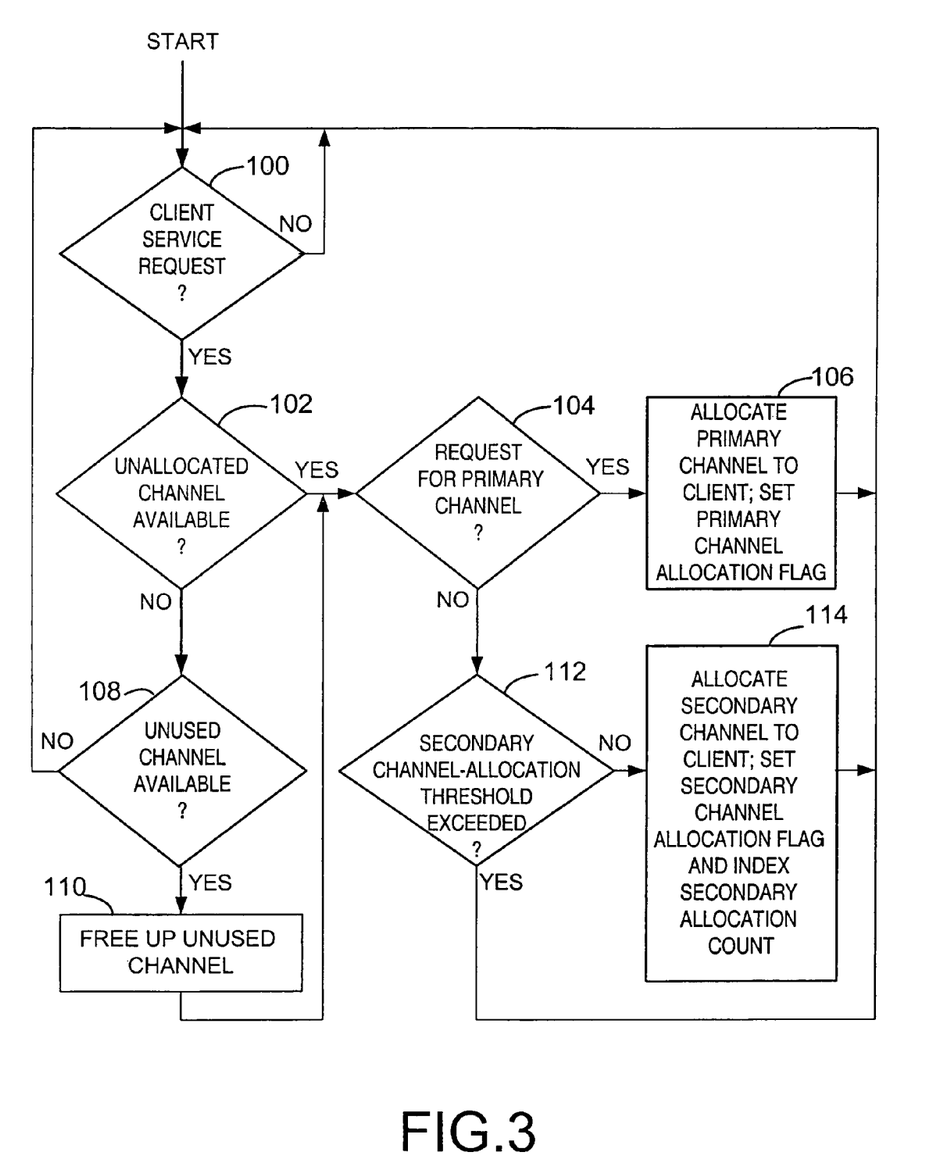
FIG. 3 is a flow chart illustrating the channel allocation limitation and port reallocation methods according to the invention in correspondence with the decision and allocation logic blocks of FIG. 2.

FIG. 3 illustrates the preferred methods in accordance with the invention by which the allocation of secondary channels to earlier users/clients is limited in the first instance and by which previously allocated secondary channels that are not in use by earlier clients are reallocated to later users/clients. Unless otherwise indicated, the control flow is from top to bottom and left to right. Those skilled in the art will appreciate that the flow chart in accordance with the invention is implemented in software resident within a memory and executed by a processor that form a part of apparatus 10, but which are not explicitly shown in FIG. 2. Those skilled in the art will appreciate that usage table 12, decision logic 14 and allocation logic 16 which realize the invented methods alternatively may be implemented in firmware or hardware, within the spirit and scope of the invention.

Referring to FIG. 3, the allocation methods in accordance with the invention START at decision block 100. The channel resource allocation/reallocation procedure may be invoked, as will be appreciated by those skilled in the art, by the operating system software repeatedly starting it as a task, or by client service request interrupt logic, or by a timing queue or multi-task time-slice, or by operating always as a background task, or by any other suitable means within the spirit and scope of the invention. The channel resource allocation method and apparatus may be understood to be implemented in accordance with the invention in one embodiment as a computer-readable medium containing a program comprising one or more software routines performing the usage table lookup, decision and allocation logic functions described and illustrated herein.

At 100, a decision is made whether a client service request has been received by apparatus 10. If so, then it is determined 102 whether there is an unallocated channel available. If a client service request is pending and there is an unallocated channel available, then at 104 it is determined whether the service request is for a primary or secondary channel. Such a determination is made in accordance with the invention by decision logic 14 reading client and channel assignment data from memory such as usage table 12. If it is determined that the service request is for a primary channel, e.g. the request is from a new client, then at 106, a primary channel is allocated to the client requesting service and a flag is set to indicate that the particular primary channel resource has been allocated. It will be appreciated that this and other flags may be represented as a bit or bit field resident in memory. After the flag is set to indicate the allocation of a particular primary channel to a new client, further client service requests are monitored at decision block 100.

If there is no unallocated channel available, as determined by block 102, then it is determined at 108 whether there is nevertheless an unused channel available. If not then further client service requests are monitored at block 100. If there is an unused channel available—by which is meant there is an already-allocated channel that is either unused or under-utilized by the client to which it is allocated—then the unused or under-utilized channel is de-allocated, or freed up, at 110, and the nature of the service request is determined at 104. If it is determined at 104 that the service request is for a secondary channel, i.e. an existing client has not yet been allocated a secondary channel, then control passes to decision block 112.

It is determined at block 112 whether a secondary channel-allocation threshold has been exceeded. If so, then control returns to decision block 100 where further client service requests are awaited. If the threshold has not been exceeded, then at 114 a secondary channel is allocated to the client to which a primary channel may have been allocated at 106. Also at 114, a secondary channel-allocation count is indexed to tally the secondary channel allocation so that the secondary channel-allocation threshold may be later tested at 112.

It may be seen from FIG. 3 that the first method in accordance with the invention by which only a limited number of secondary channels automatically are allocated to earlier users/clients is implemented by blocks 100 (YES), 102 (YES), 104 (NO), 112 (NO) and 114. The second method in accordance with the invention by which previously allocated but presently unused or under-utilized secondary channels are reallocated in favor of later users/clients is implemented by blocks 100 (YES), 102 (NO), 108 (YES), 110, 104 (NO), 112 (NO) and 114 (secondary channel allocation). Alternatively, the second method in accordance with the invention is implemented by blocks 100 (YES), 102 (NO), 108 (YES), 110, 104 (YES) and 106 (primary channel allocation). If the secondary channel-allocation threshold is exceeded at block 112 (YES) or if there are no unused or under-utilized channels available at block 108 (NO), then no channel may be allocated until such later time as a client request may be serviced when either an unallocated or unused or under-utilized channel becomes available at 102 (YES) or 108 (YES), respectively.

Depending upon desired system priorities and market demands, apparatus 10 may implement either one or both of the described methods. In other words, more or less priority may be given to earlier or later users/clients and contention between, for example, an earlier client with an allocated but momentarily unused secondary channel and a later client requesting service may be resolved based upon such desired system design parameters. The threshold beyond which a secondary channel is no longer allocated to earlier clients but instead is reserved for use by later clients is also subject to such desired system design parameters and customer demands. The threshold may be set, for example, at approximately 65-70%, meaning that only that percentage of the available channels automatically are allocated as secondary channels to earlier users/clients.

For illustration purposes in FIG. 2, two-thirds of the clients automatically are allocated such secondary channels, e.g. earlier $CLIENT_1$ and earlier $CLIENT_2$ are automatically allocated a secondary channel, but earlier $CLIENT_3$ is not, thus making it possible for apparatus 10 to serve later $CLIENT_{n-1}$. Within the spirit and scope of the invention, the allocation of limited channel resources may be based upon any suitable criteria and thresholds that are deemed responsive to competing demands of diverse users/clients and/or ISPs.

Those of skill in the art also will appreciate that the determination to allocate a previously allocated secondary channel of an earlier user/client as a primary channel to a later user/client is subject to certain timing constraints. For example, it is possible that earlier $CLIENT_1$ will begin to use the allocated secondary channel in the near future but is not using it at the time the decision is made at decision block 108 in FIG. 3. In such a case, the available secondary channel will be de-allocated with respect to $CLIENT_1$ and reallocated with respect to $CLIENT_n$. As a result, earlier $CLIENT_1$ may not be served to the desired extent until such a later time as another secondary channel is freed up for allocation to earlier $CLIENT_1$. Meanwhile, in accordance with the invention, service will be extended to later $CLIENT_n$ who otherwise would not have been served at all. Thus, it is contemplated as being within the spirit and scope of the invention that time averaged, rather than instantaneous, usage and other criteria may be used in the limited channel resource allocation methodology of the invention. In this way, limited channel resources are made to meet all or most of various demands placed on them by many users/clients.

Those skilled in the art will appreciate that usage table 12 may be used to store such variables as the flags, the channel usage and utilization factors, threshold criteria, client and channel status indicators and other variables that are maintained and updated in accordance with the invention as illustrated in FIG. 3. Those skilled in the art also will appreciate that the flow chart may be implemented in software or firmware or a combination thereof using any suitable operating systems and data structures, with the software or firmware being written in any suitable language compatible with object code execution by the target processor forming a part of apparatus 10.

Those skilled in the art that, within the spirit and scope of the invention, the threshold criteria for secondary channel allocation and under-utilization may be stored and/or calculated or otherwise derived and may exist for decision-making in any suitable form. For example, the determination and decisional criteria may be in the form of counts, averages, indices, ratios, percentages, or other means by which the allocation, de-allocation and reallocation decisions are made.

Two principal goals are thus achieved by the methods and apparatus in accordance with the invention: secondary channels are allocated intelligently rather than automatically when a client is allocated a primary channel. Advantageously, this reserves a bank of secondary channels for new client service requests. Moreover, unused channels that may have been previously allocated to earlier clients who are not using them or who are under-utilizing them are allocated instead to later clients requesting service. Advantageously, earlier clients are served by apparatus 10 but not to the exclusion of later clients whose requests would otherwise be denied. Limited channel resources are managed in accordance with the invention to better serve a larger number of clients, providing multilink PPP service between a larger number of clients and their requested ISPs than has been possible before the invention.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

The invention claimed is:

1. In a multilink point-to-point protocol (PPP) network access server, a method of allocating ports among various clients comprising:
   allocating a primary port to a first client responsive to a first service request;
   allocating a secondary port to the first client responsive to the first service request;
   monitoring usage of the primary and secondary ports by the first client to determine if the secondary port is underutilized based on a predetermined threshold usage level;
   receiving a second service request from a second client;
   responsive to receiving the second request, identifying the secondary port as a currently underutilized port that is available for reallocation, wherein availability is based on a predetermined secondary port reallocation threshold; and
   responsive to the determining the secondary port is underutilized and available for reallocation, deallocating the secondary port from the first client and reallocating the secondary port to the second client based at least in part upon an average level of use of the secondary port over a predetermined time period by the first client.

2. The method of claim 1, further comprising allocating the secondary port to the first client only upon a determination that traffic on the primary port for the first client exceeds a prescribed load.

3. The method of claim 1, further comprising:
   allocating pairs of primary and secondary ports among multiple clients; and
   determining whether one or more of the multiple clients is underutilizing an allocated pair of primary and secondary ports and if so deallocating the underutilized secondary ports associated with the allocated pair.

4. The method of claim 1, further comprising deallocating the secondary port from the first client and reallocating the secondary port to the second client if the secondary port is not being used by the first client.

5. The method of claim 1, further comprising deallocating the secondary port from the first client and reallocating the secondary port to the second client based at least in part on a level of use of the secondary port by the first client within a predetermined time period.

6. The method of claim 1, further comprising concurrently allocating the primary port and the secondary port to the first client and deallocating the secondary port from the first client according to other port allocations on the network access server.

7. The method of claim 1, wherein the allocation of the secondary port to the second client is performed only if a current number of allocated secondary ports is less than a prescribed maximum.

8. The method of claim 6, wherein the deallocation of the secondary port from the first client and reallocating of the secondary port to the second client is performed by the network access server.

9. An apparatus comprising:
a network processing device configured to:
allocate a primary channel resource to a first client responsive to a first service request;
allocate a secondary channel resource to the first client responsive to the first service request;
monitor utilization of the allocated primary and secondary channel resources;
identify the secondary channel resource as underutilized based on a predetermined threshold usage level;
determine that the underutilized secondary channel resource is currently available for reallocation based on one or more predetermined secondary channel resource reallocation criteria;
receive a second service request from a second client; and
responsive to receiving the second request, deallocate the secondary channel resource from the first client and reallocate the secondary channel resource to the second client based at least in part upon an average level of use of the secondary channel resource over a redetermined time period by the first client if the secondary channel resource is currently available for reallocation.

10. The apparatus of claim 9, wherein the network processing device is further configured to:
assign the primary and associated secondary channel resources together in an associated pair; and
determine availability of the secondary channel resource independently of the availability of the primary channel resource associated with the secondary channel resource.

11. The apparatus of claim 9, wherein the network processing device comprises a multilink point-to-point protocol (PPP) access server configured to connect clients with one or more Internet service providers through the primary and secondary channel resources.

12. The apparatus of claim 9, wherein the network processing device is further configured to:
allocate a plurality of primary channel resources and a plurality of secondary channel resources; and
allocate one of the primary resources and an associated one of the secondary channel resources to a first client and reallocate the associated one of the secondary channel resources only if a number of currently allocated secondary channel resources is less than a prescribed value.

13. The apparatus of claim 12, wherein the network processing device further comprises:
a usage table indicating present usage of the primary and secondary channel resources;
decision logic configured to determine present availability of the secondary channels; and
allocation logic configured to allocate and reallocate the secondary channel resources.

14. An article of manufacture including a non-transitory computer-readable medium having instructions stored thereon that, if executed by a computing device, cause the computing device to perform a method comprising:
allocating a primary channel resource and a secondary channel resource to a client responsive to a first service request;
monitoring usage of the primary and secondary channel resources by the client to determine if the secondary channel resource is underutilized based on a predetermined threshold usage level associated with the primary channel resource or the secondary channel resource, combinations thereof;
receiving a second service request;
responsive to the second service request, identifying the secondary channel resource as a currently underutilized secondary channel resource that is available for reallocation based on one or more predetermined secondary channel resource reallocation criteria; and
responsive to the determining the secondary channel resource is underutilized and available for reallocation, deallocating the secondary channel resource from the client and reallocating the secondary channel resource to another client based at least in part upon an average level of use of the secondary channel resource over a predetermined time period by a user.

15. The article of manufacture according to claim 14, further comprising:
allocating a plurality of primary channel resources and a plurality of secondary channel resources; and
reallocating the secondary channel resource when all other primary channel resources of the plurality of primary channel resources are currently being utilized.

16. The article of manufacture according to claim 15, further comprising:
allocating the plurality of primary channel resources and the plurality of secondary channel resources in pairs among multiple clients; and
determining whether one or more of the multiple clients is underutilizing an allocated pair of primary and secondary channel resources, wherein if one or more allocated pairs are determined to be underutilized then deallocating corresponding underutilized secondary channel resources.

* * * * *

UNITED STATES PATENT AND TRADEMARK OFFICE
CERTIFICATE OF CORRECTION

PATENT NO. : 7,958,239 B1  
APPLICATION NO. : 10/860533  
DATED : June 7, 2011  
INVENTOR(S) : Prasad Y. Chebrolu Page 1 of 1

It is certified that error appears in the above-identified patent and that said Letters Patent is hereby corrected as shown below:

Title page, Column 2, Item (56) (Other Publications), Line 1, delete "Interec" and insert --Intertec--, therefor.

Column 9, Line 8, in claim 8, delete "deallocation" and insert --deallocating--, therefor.

Column 9, Line 31, in claim 9, delete "redetermined" and insert --predetermined--, therefor.

Column 10, Line 20, in claim 14, after "resource," insert --or--.

Signed and Sealed this  
Tenth Day of July, 2012

David J. Kappos  
*Director of the United States Patent and Trademark Office*